US012646779B2

(12) United States Patent
Miao

(10) Patent No.: US 12,646,779 B2
(45) Date of Patent: Jun. 2, 2026

(54) BATTERY DEVICE AND TRAVELLING APPARATUS

(71) Applicant: SEGWAY TECHNOLOGY CO., LTD., Jiangsu (CN)

(72) Inventor: Shulin Miao, Changzhou (CN)

(73) Assignee: Segway Technology Co., Ltd., Changzhou (CN)

( * ) Notice: Subject to any disclaimer, the term of this patent is extended or adjusted under 35 U.S.C. 154(b) by 1096 days.

(21) Appl. No.: 17/224,519

(22) Filed: Apr. 7, 2021

(65) Prior Publication Data

US 2021/0313646 A1 Oct. 7, 2021

(30) Foreign Application Priority Data

Apr. 7, 2020 (CN) .......................... 202020491487.9

(51) Int. Cl.
| | |
|---|---|
| *H01M 50/24* | (2021.01) |
| *H01M 10/613* | (2014.01) |
| *H01M 10/625* | (2014.01) |
| *H01M 10/6554* | (2014.01) |
| *H01M 10/6563* | (2014.01) |
| *H01M 10/658* | (2014.01) |
| *H01M 50/202* | (2021.01) |

(Continued)

(52) U.S. Cl.
CPC ......... *H01M 50/24* (2021.01); *H01M 10/613* (2015.04); *H01M 10/625* (2015.04); *H01M 10/6554* (2015.04); *H01M 10/6563* (2015.04); *H01M 10/658* (2015.04); *H01M 50/202* (2021.01); *H01M 50/244* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2,035,066 A | * | 3/1936 | Havas | ..................... B60R 16/04 |
| | | | | 180/68.5 |
| 5,086,860 A | * | 2/1992 | Francis | ............... H01M 50/249 |
| | | | | 180/68.5 |

(Continued)

FOREIGN PATENT DOCUMENTS

| | | | | |
|---|---|---|---|---|
| JP | 2004362879 A | * | 12/2004 | |
| JP | 2009193871 A | * | 8/2009 | |

OTHER PUBLICATIONS

Machine Engish of JP2004362879A from Espacenet originally published to Takagi et al Dec. 24, 2004 (Year: 2004).*

(Continued)

*Primary Examiner* — Mary Grace Byram
(74) *Attorney, Agent, or Firm* — Harter Secrest & Emery LLP; Timothy W. Menasco, Esq.

(57) ABSTRACT

Embodiments of the present application disclose a battery device and a travelling apparatus. The battery device includes a battery body and a thermal insulator. The battery body includes a battery and a housing enclosing the battery. The thermal insulator is provided to at least a side of the housing, and the thermal insulator and the housing define a clearance space therebetween. The clearance space has an air layer therein. The thermal insulator and the air layer are used to prevent hot air from heating the battery body when the hot air flows to the thermal insulator.

6 Claims, 3 Drawing Sheets

(51) Int. Cl.
    *H01M 50/244*        (2021.01)
    *H01M 50/249*        (2021.01)

(56)                      References Cited

U.S. PATENT DOCUMENTS

| | | | |
|---|---|---|---|
| 9,941,554 B2 | 4/2018 | Fuhr et al. | |
| 2006/0068278 A1 | 3/2006 | Bloom et al. | |
| 2011/0183177 A1* | 7/2011 | Sohn | H01M 10/425 |
| | | | 429/120 |
| 2017/0316908 A1* | 11/2017 | Agliata | H01M 50/296 |
| 2018/0205055 A1* | 7/2018 | Hilligoss | H01M 10/443 |
| 2019/0058229 A1 | 2/2019 | Springer et al. | |
| 2020/0040474 A1* | 2/2020 | Herrmann | C25B 9/73 |
| 2022/0247029 A1* | 8/2022 | Takahashi | H01M 10/441 |
| 2022/0407175 A1* | 12/2022 | Miyata | H01M 50/229 |

OTHER PUBLICATIONS

Machine English translation of JP2009193871A originally published to Kimura Aug. 27, 2009 (Year: 2009).*
Search Report for EP application 21167095.5.

* cited by examiner

BATTERY DEVICE AND TRAVELLING APPARATUS

CROSS-REFERENCE TO RELATED APPLICATION

This application claims priority to and benefits of Chinese Patent Application Serial No. 202020491487.9, filed with National Intellectual Property Administration of PRC on Apr. 7, 2020, the entire content of which is incorporated herein by reference.

FIELD

The present application relates to a battery device and a travelling apparatus.

BACKGROUND

Battery devices are commonly used devices of travelling apparatuses. The travelling apparatuses are powered by the battery devices. However, in the related art, the battery device is easily affected by the hot air to cause an increase in the temperature of the battery device, affecting the performance of the battery device.

SUMMARY

In view of this, embodiments of the present application are intended to provide a battery device.

Embodiments of the present application provide a battery device including: a battery body including a battery and a housing enclosing the battery; and a thermal insulator provided to at least a side of the housing, the thermal insulator and the housing defining a clearance space therebetween, and the clearance space having an air layer therein.

Embodiments of the present application further provide a travelling apparatus including a battery device and a frame. The battery device includes a battery body including a battery and a housing enclosing the battery, and a thermal insulator provided to at least a side of the housing, the thermal insulator and the housing defining a clearance space therebetween, and the clearance space having an air layer therein. The housing is secured to the frame, and the thermal insulator is provided to a bottom side of the housing.

Figure 1:
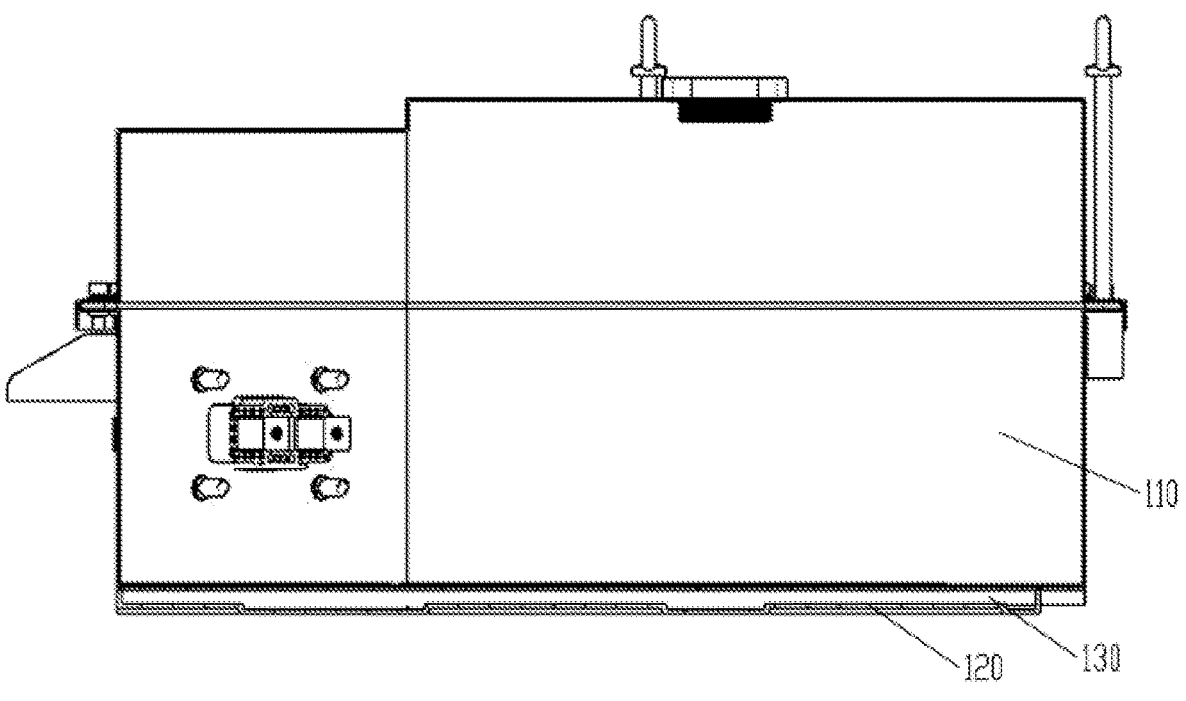
FIG. 1 is a cross-sectional view of an optional structure of a battery device in an embodiment of the present application.

Reference numerals: 110 battery body: 120 thermal insulator: 130 air layer: 140 fan: 150 flow guide member.

DETAILED DESCRIPTION

The present application will be further described in detail below in combination the accompanying drawings and specific embodiments. It should be understood that, the specific embodiments described herein are only used to explain the present application, but not to limit the present application.

In the embodiments of the present application, it should be noted that, unless specified or limited otherwise, the term "connected" is used broadly, and may be, for example, electrical connections: may also be inner communications of two elements: may also be direct connections or indirect connections via intervening structures: which can be understood by those skilled in the art according to specific situations.

It should be noted that, the terms "first\second\third" involved in the embodiments of the present application are merely used to distinguish similar objects, and do not represent a particular sort of the objects. It should be understood that, particular order and precedence sequence for the terms "first\second\third" can be exchanged if permitted. It should be understood that, the objects distinguished by "first\second\third" can be exchanged under appropriate circumstances, such that the embodiments of the present application described herein can be implemented in orders in addition to those illustrated or described herein.

It should be noted that the embodiments in the present disclosure and the features in the embodiments may be combined with each other without conflict. A battery device recited in embodiments of the present application will be described in detail below in combination with FIGS. 1 to 4.

The battery device includes: a battery body 110 and a thermal insulator 120. The battery body 110 includes a battery 112 and a housing 114 enclosing the battery 112. The thermal insulator 120 is provided to at least a side of the housing 114, and the thermal insulator 120 and the housing 114 define a clearance space therebetween. The clearance space has an air layer 130 therein. The thermal insulator 120 and the air layer 130 are used to prevent hot air from heating the battery body 110 when the hot air flows to the thermal insulator 120. Therefore, the thermal insulator 120 and the air layer 130 can prevent the hot air from increasing the temperature of the battery body 110, improving the performance of the battery device.

In embodiments of the present application, the battery body 110 includes a battery 112 and a housing 114 enclosing the battery 112.

Herein, the structure of the battery 112 is not limited, as long as it can supply electricity to other apparatuses.

Herein, the housing 114 is used to protect the battery 112, and the structure of the housing 114 is not limited, as long as the battery 112 is enclosed. The housing 114 can wrap an outside of the battery 112 and enclose the battery 112.

In embodiments of the present application, the structure of the thermal insulator 120 is not limited, as long as the thermal insulator 120 is provided to at least a side of the housing 114, and the thermal insulator 120 and the housing 114 define a clearance space therebetween.

Figure 4:
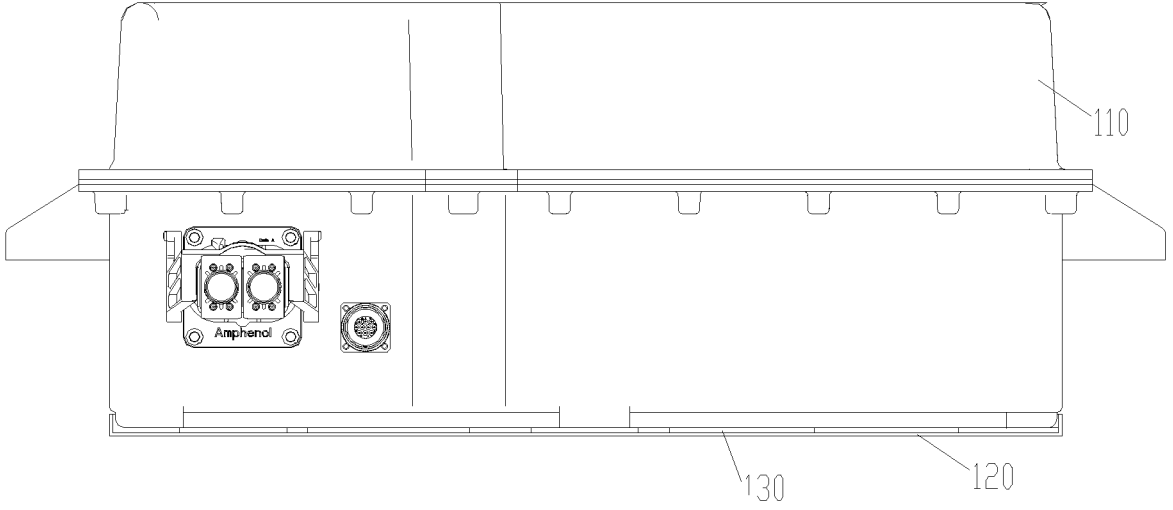
FIG. 4 is a schematic view of an optional structure of a battery device in an embodiment of the present application.

For example, as illustrated in FIGS. 1 and 4, the thermal insulator 120 may have a plate-like structure. Herein, the thermal insulator 120 can only cover a surface of a side of the battery body 110.

Herein, the clearance space may be a closed space, or a non-closed space. As an example, a periphery of the thermal insulator 120 is sealingly connected to the housing 114. That is, the clearance space is a closed space such that the thermal insulator 120 and the housing 114 are completely isolated by the closed clearance space, improving the thermal insulation effect of the thermal insulator 120. As another example, the thermal insulator 120 is connected to the housing 114 by a strut. That is, the clearance space is a non-closed space.

Figure 2:
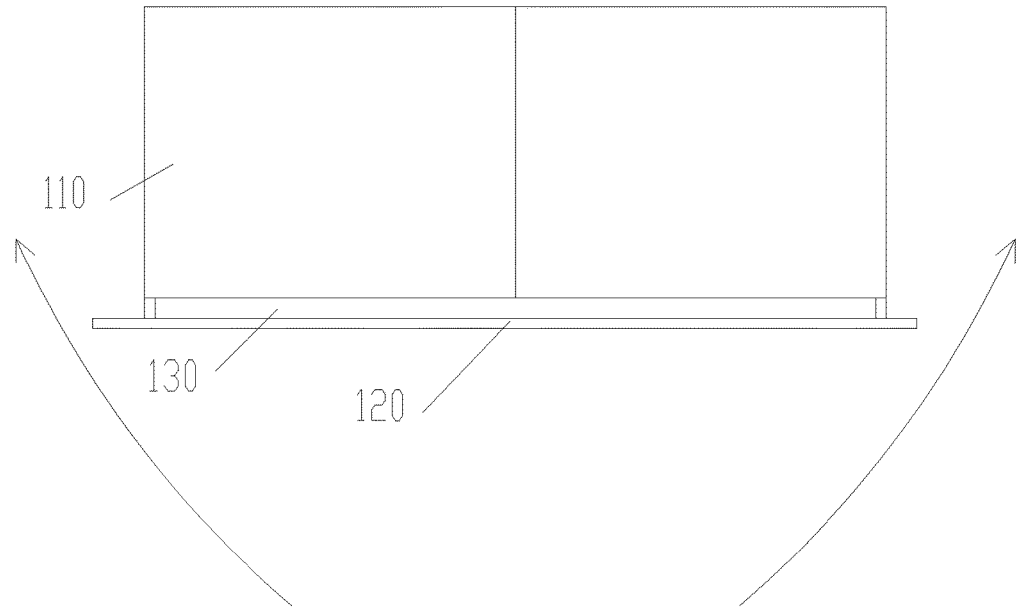
FIG. 2 is a schematic view of an optional structure of a battery device in an embodiment of the present application, in which arrow directions refer to flow directions of hot air.

Herein, an area of the thermal insulator 120 is not limited. The area of the thermal insulator 120 may be equal to an area of a surface of a side of the battery body 110, or the area of the thermal insulator 120 may also be smaller than the area of the surface of the side of the battery body 110. As an example, as illustrated in FIG. 2, the area of the thermal insulator 120 is greater than of an area of a surface of a side of the housing 114, the thermal insulator 120 covers the surface of the side of the housing 114, and an edge of the insulator 120 protrudes from the surface of the housing 114, to achieve that the thermal insulator 120 fully covers the surface of the side of the housing 114. When the hot air flows to the thermal insulator 120, the thermal insulator 120 is used to render the hot air to bypass the housing 114, and make a clearance defined between the hot air and the housing 114. Thus, contact between the hot air and the battery body 110 can be effectively prevented.

By way of another example, the thermal insulator 120 has an accommodating groove 122, and at least a part of the battery body 110 is located in the accommodating groove 122.

Figure 3:
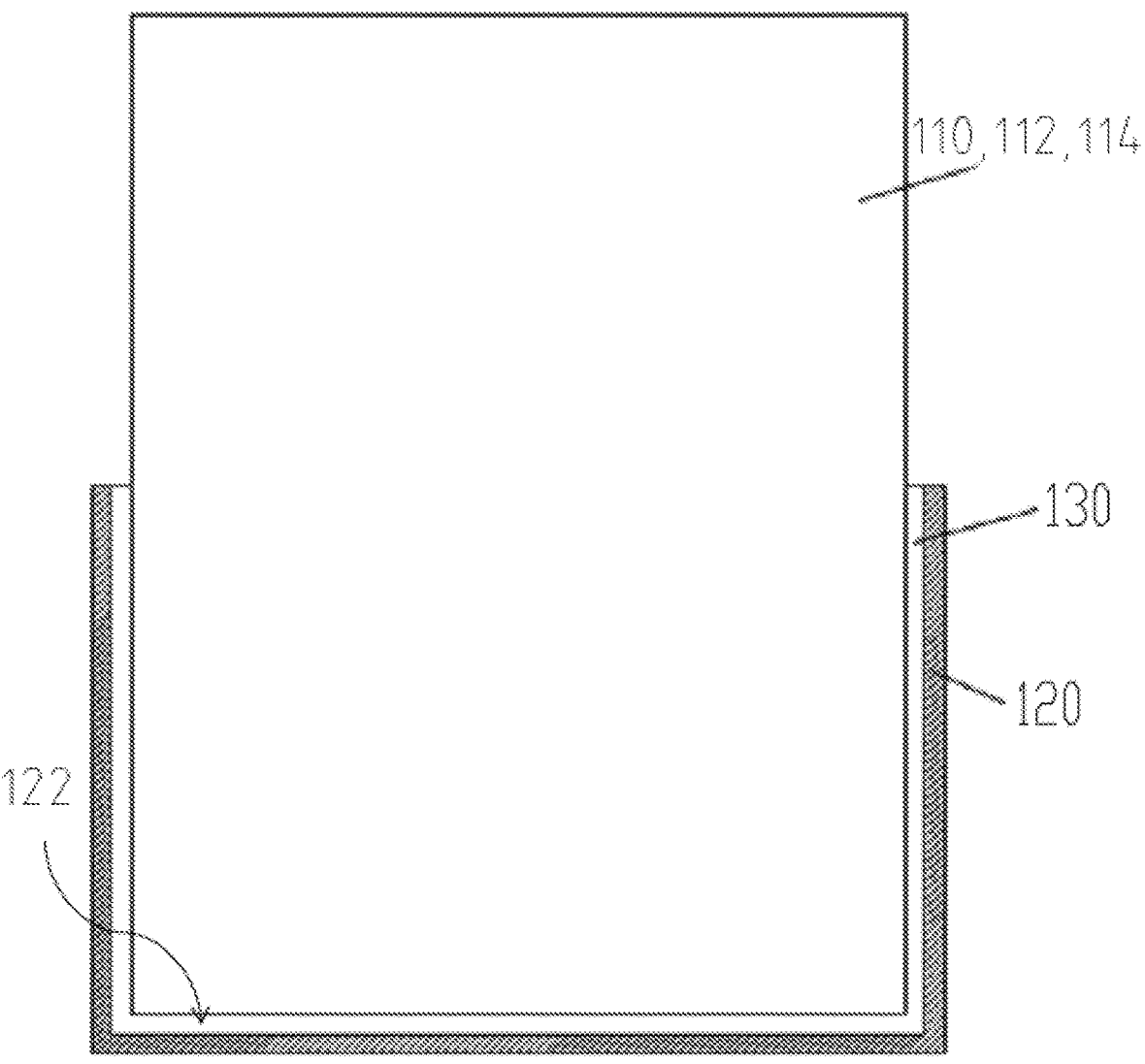
FIG. 3 is a cross-sectional view of an optional structure of a battery device in an embodiment of the present application.

Herein, as illustrated in FIG. 3, a first part of the battery body 110 is located in the accommodating groove 122, and a second part of the battery body 110 is located outside the accommodating groove 122. Certainly, the battery body 110 may also be wholly located in the accommodating groove 122.

Herein, the thermal insulator 120 covers a plurality of surfaces of the housing 114. When the hot air flows to the thermal insulator 120, the thermal insulator 120 can reduce the heating of the hot air to the battery body 110, thereby preventing an excessive temperature of the battery body 110.

Herein, the periphery of the thermal insulator 120 may be sealingly connected to the housing 114. That is, the clearance space is a closed space such that the thermal insulator 120 and the housing 114 are completely isolated by the closed clearance space, improving the thermal insulation effect of the thermal insulator 120. As another example, the thermal insulator 120 is connected to the housing 114 by a strut. That is, the clearance space is a non-closed space.

A set position of the thermal insulator 120 is not limited. For example, the thermal insulator 120 may be located at a top side of the battery body 110. By way of another example, as illustrated in FIGS. 1 to 3, the thermal insulator 120 may also be located at a bottom side of the battery body 110. By way of yet another example, the thermal insulator 120 may also be located at an edge side of the battery body 110. The position of the thermal insulator 120 can be flexibly set according to the position of the battery body 110 relative to a heat source, such as an engine radiator on a vehicle.

The implementations of the arrangement of the thermal insulator 120 to the battery body 110 are not limited. For example, the thermal insulator 120 may be connected to the battery body 110 by welding to be arranged to the battery body 110. By way of another example, the thermal insulator 120 may be detachably connected to the battery body 110 through a snap-fit structure, to be arranged to at least a side of the housing 114.

In the embodiments of the present embodiments, the structure of the clearance space is not limited, as long as the clearance space has an air layer 130 therein. Thus, when the hot air passes through the surface of the thermal insulator 120 to heat the thermal insulator 120, the transfer of heat absorbed by thermal insulator 120 to the battery body 110 can be reduced by the air layer 130.

In some optional implementations of the embodiments of the present application, the battery device may further include a fixing member. The fixing member is fixedly connected to the battery body 110, and the fixing member is used to secure the battery device. The fixing member and the thermal insulator 120 are provided to different positions of the battery body 110, such that the battery body 110 is secured to other structures through the fixing member. For example, the battery body 110 is secured to a frame 210 of a travelling apparatus through the fixing member.

In the present implementation, the structure of the fixing member is not limited. For example, the fixing member may be a protruding structure secured to the battery body 110, the protruding structure is provided with a mounting hole, and the battery body 110 is secured to other structures through the mounting hole.

The battery device in the embodiments of the present application includes: a battery body 110 and a thermal insulator 120. The battery body 110 includes a battery 112 and a housing 114 enclosing the battery 112. The thermal insulator 120 is provided to at least a side of the housing 114, and the thermal insulator 120 and the housing 114 define a clearance space therebetween. The clearance space has an air layer 130 therein. The thermal insulator 120 and the air layer 130 are used to reduce the heat of the hot air transferred to the battery body 110 when the hot air flows to the thermal insulator 120. Therefore, the thermal insulator 120 and the air layer 130 can prevent the hot air from increasing the temperature of the battery body 110, improving the performance of the battery device.

Embodiments of the present application further recite a travelling apparatus including the battery device recited in the embodiments of the present application.

In the embodiments of the application, the structure of the travelling apparatus is not limited. For example, the travelling apparatus may be an all-terrain vehicle, a beach buggy, and so on.

In some optional implementations of the embodiments of the present application, the travelling apparatus may also include a frame 210 and a buffer 220. The housing 114 is secured to the frame 210, and the thermal insulator 120 is provided to a bottom side of the housing 114. The buffer 220 is provided between the thermal insulator 120 and the frame 210 such that damage to the thermal insulator 120 due to collision of the thermal insulator 120 and the frame 210 during traveling of the travelling apparatus can be prevented.

In the present implementation, the structure of the frame 210 is not limited. For example, the frame 210 may be a frame 210 of an all-terrain vehicle, or may also be a frame 210 of a beach buggy.

Figure 5:
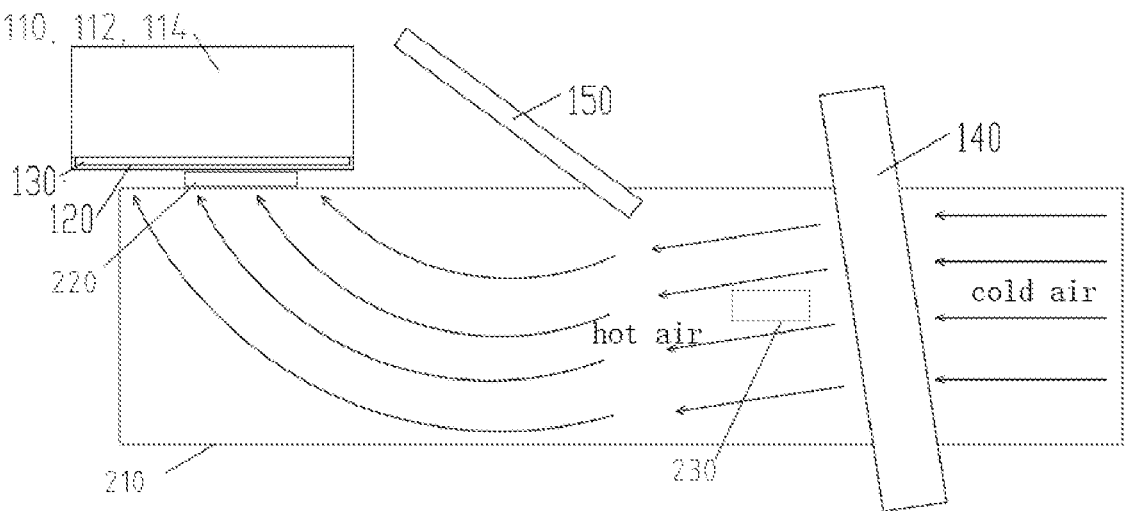
FIG. 5 is a schematic view of a part of a travelling apparatus in an embodiment of the present application, in which a frame is hided, and arrow directions refer to flow directions of air.

In the present implementation, as illustrated in FIG. 5, the travelling apparatus may also include a flow guide member 150. The flow guide member 150 is provided to the frame 210, and the flow guide member 150 is used to guide the hot air to thermal insulator 120. The hot air is guided to the thermal insulator 120 through the flow guide member 150, such that the hot air can be prevented from heating the surfaces of housing 114 without the thermal insulator 120.

In some optional implementations of the embodiments of the present application, as illustrated in FIG. 5, the travelling apparatus may further include a fan 140. The fan 140 is provided to the frame 210, and the fan 140 is used to dissipate heat for a heating member 230 of the travelling apparatus. The battery device is provided in an air guide passage of the fan 140, and the thermal insulator 120 is located at a side of the battery body in the air guide passage close to the fan 140. When the fan 140 guides the hot air to the thermal insulator 120, the thermal insulator 120 and the air layer 130 are used to prevent the hot air from heating the battery body 110. Thus, the thermal insulator 120 and the air layer 130 can prevent the hot air from increasing the temperature of the battery body 110, improving the performance of the battery device.

In the present implementation, the structure of the fan 140 is not limited, as long as the fan 140 can dissipate heat for the heating member 230 of the travelling apparatus. For example, the fan 140 may be an axial fan.

Herein, the implementations of the arrangement of the fan 140 to the frame 210 are not limited. For example, the fan 140 may be secured to the frame 210 through a bolt.

Herein, the structure of the heating member 230 is not limited. For example, the heating member 230 may be a controller, a circuit board, or the like of the travelling apparatus.

In the present implementation, the battery device is provided in the air guide passage of the fan 140, and the thermal insulator 120 is located at a side in the air guide passage close to the fan 140. Thus, when the fan 140 guides the hot air to the thermal insulator 120, the thermal insulator 120 and the air layer 130 can prevent the hot air from heating the battery body 110.

In the present implementation, as illustrated in FIG. 5, the flow guide member 150 is provided to the frame 210, the flow guide member 150 and the thermal insulator 120 are located at different sides of the battery body 110, and the flow guide member 150 and the housing 114 define a clearance therebetween. The flow guide member 150 is used to prevent the hot air from flowing to the battery body 110, such that the flow guide member 150 can also prevent the hot air from heating the battery body 110.

Herein, the structure of the flow guide member 150 is not limited. For example, the flow guide member 150 may have a plate-like structure. As an example, a projection area of the battery body 110 in a first direction is located within a projection area of the flow guide member 150 in the first direction. The first direction refers to a flow direction of the hot air from the fan 140 to the flow guide member 150. Thus, the hot air is completely guided to the thermal insulator 120 through the flow guide member 150, and the hot air is prevented from heating the battery body 110 by the thermal insulator 120 and the air layer 130.

Herein, the implementations of the arrangement of the flow guide member 150 to the frame 210 are note limited. For example, the flow guide member 150 may be secured to the frame 210 through a bolt.

It should be noted that, in FIG. 5, arrow directions at cold air refer to flow directions of the air that does not undergo the heat exchange yet, and arrow directions at the hot air refer to flow directions of the air that has undergone the heat exchange.

The above-described are merely specific implementations of the present application, but the protection scope of the present application is not limited to this. The conceivable change or alternative by those skilled in the art within the technical scope disclosed by the present application should be covered in the protection scope of the present application. Therefore, the protection scope of the present application is subject to the protection scope of the claims.

What is claimed is:

1. A battery device, comprising:
a battery body comprising a battery and a housing enclosing the battery; and
a thermal insulator provided to at least a side of the housing, a periphery of the thermal insulator is sealingly connected to the housing to define a closed clearance space between the thermal insulator and the housing such that the thermal insulator and the housing are separated with the closed clearance space in-between, and the clearance space having an air layer therein,
wherein the thermal insulator, which defines the closed clearance space with the housing, is exposed to an external environment, and the thermal insulator and the air layer are configured to prevent hot air flowing to the thermal insulator from heating the battery body;
wherein the thermal insulator covers only one side of the battery body; and
wherein the thermal insulator is detachably connected to the battery body through a snap-fit structure.

2. The battery device according to claim 1, wherein the thermal insulator has a plate-like structure.

3. The battery device according to claim 1, wherein the thermal insulator has a plate-like structure, and an edge of the thermal insulator protrudes from a surface of the housing.

4. The battery device according to claim 1, wherein the thermal insulator has an accommodating groove, and at least a part of the battery body is located in the accommodating groove.

5. The battery device according to claim 1, wherein the thermal insulator is located at a top side of the battery body; or
the thermal insulator is located at a bottom side of the battery body; or
the thermal insulator is located at an edge side of the battery body.

6. The battery device according to claim 1, wherein an area of the thermal insulator is equal to an area of the side of the battery body; or an area of the thermal insulator is smaller than an area of the side of the battery body; or an area of the thermal insulator is greater than an area of the side of the battery body.

* * * * *